US012645602B2

(12) United States Patent (10) Patent No.: US 12,645,602 B2

Vijayvergiya et al. (45) Date of Patent: Jun. 2, 2026

(54) LOW WATERMARK BUFFER CACHE

(71) Applicant: SAP SE, Walldorf (DE)

(72) Inventors: Nishant Vijayvergiya, Pune (IN); Amit Pathak, Pune (IN); Sebastian Seifert, Weinboehla (DE); Thomas Peh, Heidelberg (DE); Sergej Hardock, Limburg an der Lahn (DE)

(73) Assignee: SAP SE, Walldorf (DE)

( * ) Notice: Subject to any disclaimer, the term of this patent is extended or adjusted under 35 U.S.C. 154(b) by 81 days.

(21) Appl. No.: 18/495,478

(22) Filed: Oct. 26, 2023

(65) Prior Publication Data

US 2025/0139015 A1 May 1, 2025

(51) Int. Cl.
*G06F 12/123* (2016.01)
*G06F 12/1009* (2016.01)

(52) U.S. Cl.
CPC ........ *G06F 12/1009* (2013.01); *G06F 12/123* (2013.01)

(58) Field of Classification Search
CPC ............................ G06F 12/1009; G06F 12/123
USPC ...................................................... 711/206
See application file for complete search history.

(56) References Cited

U.S. PATENT DOCUMENTS

| | | | |
|---|---|---|---|
| 2009/0157974 A1* | 6/2009 | Lasser ................. | G06F 12/0893 |
| | | | 711/135 |
| 2017/0185645 A1* | 6/2017 | Agarwal ........... | G06F 16/24552 |
| 2018/0253468 A1* | 9/2018 | Gurajada ............ | G06F 16/2255 |
| 2019/0258580 A1* | 8/2019 | Booss ................... | G06F 12/123 |
| 2023/0011790 A1* | 1/2023 | Agarwal ........... | G06F 16/24552 |

* cited by examiner

*Primary Examiner* — Jared I Rutz
*Assistant Examiner* — Wei Ma
(74) *Attorney, Agent, or Firm* — Mintz Levin Cohn Ferris Glovsky and Popeo, P.C.

(57) ABSTRACT

In some implementations, there is provided a method that includes configuring a first threshold for page-loadable data at a buffer cache associated with a database; checking the buffer cache to determine usage of the buffer cache by the page-loadable data; in response to the usage of the buffer cache being more than the first threshold, causing a background job to release one or more buffers in the buffer cache; checking, after releasing at least one buffer of the buffer cache, the buffer cache to determine whether usage by the page-loadable data is below the first threshold; in response to the usage being below the first threshold, stopping the release of additional one or more buffers in the buffer cache; and in response to the usage being above the first threshold, continuing the release of the additional one or more buffers in the buffer cache.

17 Claims, 6 Drawing Sheets

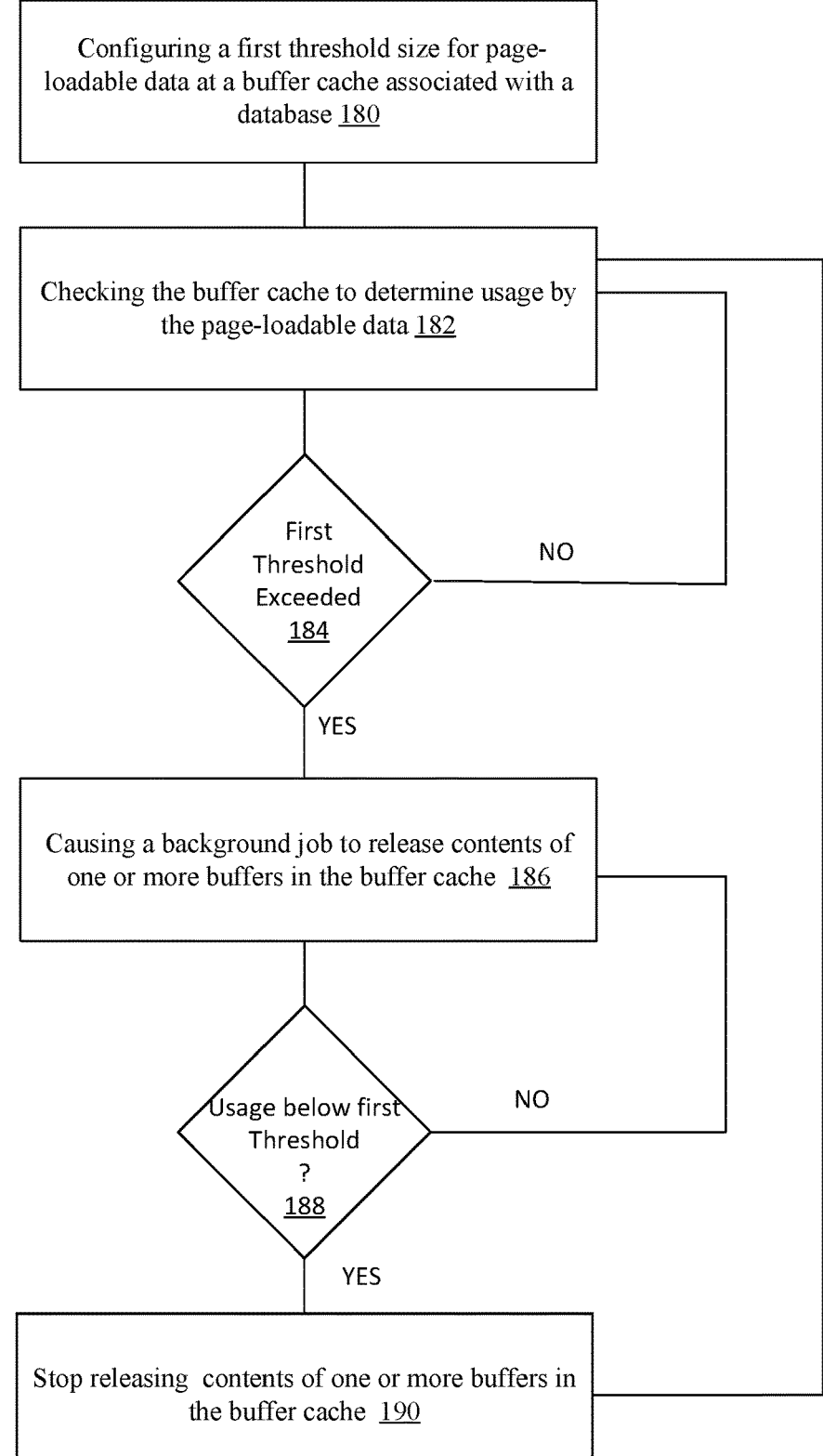

Configuring a first threshold size for page-loadable data at a buffer cache associated with a database 180

Checking the buffer cache to determine usage by the page-loadable data 182

First Threshold Exceeded 184

NO

YES

Causing a background job to release contents of one or more buffers in the buffer cache 186

Usage below first Threshold ? 188

NO

YES

Stop releasing contents of one or more buffers in the buffer cache 190

FIG. 1C

LOW WATERMARK BUFFER CACHE

TECHNICAL FIELD

The present disclosure generally relates to database technology.

BACKGROUND

A database is an organized collection of data. A database typically organizes data to correspond to how the data is logically arranged. This facilitates operations on the data, for example, looking up values in a database, adding data to the database, sorting the data in the database, or summarizing relevant data in the database. A database management system ("DBMS") mediates interactions between a database, users, and applications in order to organize, create, update, capture, analyze, and otherwise manage the data in the database.

In order to efficiently handle queries, databases are typically configured to perform in-memory operations on data. In an in-memory database, data needed to execute and respond to a query is loaded into memory, and the query is executed against that in-memory data. However, many applications have large data stores, and loading all of the required data into memory for these applications may be difficult due to memory limitations. The amount of data being processed by database systems continues to increase faster than memory devices are evolving to store more data.

SUMMARY

In some implementations, there is provided a method that includes configuring a first threshold for page-loadable data at a buffer cache associated with a database; checking the buffer cache to determine usage of the buffer cache by the page-loadable data; in response to the usage of the buffer cache being less than the first threshold, continuing to check the buffer cache to determine usage by the page-loadable data; in response to the usage of the buffer cache being more than the first threshold, causing a background job to release one or more buffers in the buffer cache; checking, after releasing at least one buffer of the buffer cache, the buffer cache to determine whether usage by the page-loadable data is below the first threshold; in response to the usage being below the first threshold, stopping the release of additional one or more buffers in the buffer cache; and in response to the usage being above the first threshold, continuing the release of the additional one or more buffers in the buffer cache.

In some variations, one or more of the features disclosed herein including the following features can optionally be included in any feasible combination. A memory hosts the database as an in-memory database and hosts the buffer cache. The first threshold is configured below a maximum memory size allocation for the buffer cache. The database checks from time to time the buffer cache to determine usage of the buffer cache by the page-loadable data. The usage of the buffer cache indicates an actual amount of the buffer cache being used, an actual amount of the buffer cache remaining, a percentage of buffer cache being used, and/or a percentage of buffer cache memory remaining. The checking is triggered by receiving a query at the database. In response to the usage of the buffer cache being more than the first threshold but less that a maximum threshold for the buffer cache, the background job causes the release of the one or more buffers in the buffer cache while one or more other database operations continue. The page-loadable data includes a portion of a database table stored in a persistent store and loaded into the buffer cache when needed to respond to a query. The buffer cache includes one or more buffers listed in a freelist pool, a least recently used pool, and a hot buffer list. The background job releases a buffer listed in the freelist pool before releasing a corresponding buffer listed in the least recently used pool or the hot buffer list. The background job releases a buffer listed in the least recently used pool before releasing a corresponding buffer listed in the hot buffer list.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1C depicts an example of a process for optimizing usage of a buffer cache, in accordance with some embodiments;

DETAILED DESCRIPTION

Data structures are commonly created and populated in memory, and once populated, data structures may be persisted in persistence storage. Once in persistence storage, a data structure may be removed from memory when not needed, for example. Then, if the data structure is again needed in memory at a future time, the data structure can be reconstructed from the information persisted in persistence storage. Loading a data structure refers to the reconstruction of the data structure in memory from the information persisted in the persistence storage. The representation of the data structure in persistence memory may not match the representation in memory, but the information stored in persistence storage is sufficient to allow for full reconstruction of the data structure in memory. In a database, a database object is a data structure used to either store or reference data. A type of database object is a database table (or table, for short). Other types of database objects include columns, indexes, stored procedures, sequences, views, metadata, and/or the like. The database may store each database object as a plurality of substructures that collectively forms and represents the database object. For a column for example, the substructures may include a dictionary, a data vector, and an index. The dictionary may associate each unique data value with a corresponding value identifier (ID). The data vector may include value IDs that map to the actual values of the database object. The index may include a sequential listing of each unique value ID and one or more positions in the data vector containing the value ID.

When bringing database objects from persistence memory locations to in-memory locations, databases can bring the database objects into memory using multiple different formats. For example, one format is referred to as a column-loadable format. For the column-loadable format, the entire column is fully loaded into memory. Fully loading the entire column into memory means bringing the entirety of the column (e.g., data) and the column's subcomponents (e.g., dictionary, index, etc.) into memory. Another type of format that can be employed is referred to as a page-loadable format. For the page-loadable format, only the pages which contain parts of the database table (e.g., column) relevant to the query are loaded into memory (e.g., when needed, such as in response to a query), so pages not relevant (e.g., needed to respond to the query) are not loaded into the memory.

Figure 1A:
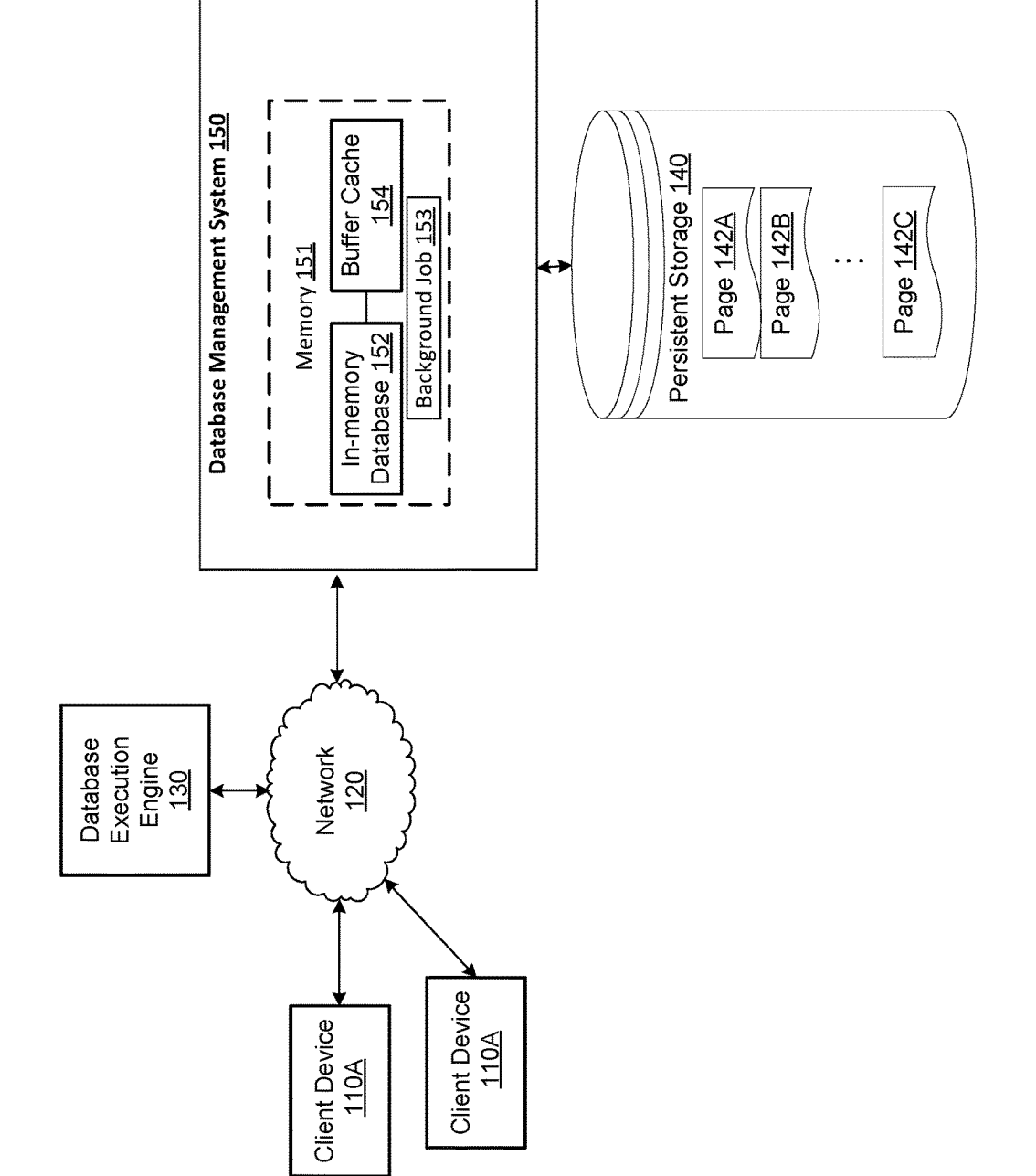
FIG. 1A depicts an example of a system, in accordance with some embodiments.

FIG. 1A depicts an example of a system 100, in accordance with some embodiments. In the example of FIG. 1A, the system includes one or more client devices 110A-B, a database execution engine 130, a database management system 150, and a persistent storage 140. In operation, a client device may generate and then send a database query towards the database management system 150. In some implementations, the database execution engine receives (e.g., obtains, intercepts, and/or the like) the query, generates a query plan, executes the query plan at the database management system, and returns a query response to the client device.

Although the database execution engine 130 is depicted as being separate from the database management system 150, the database execution engine may be incorporated into the database management system.

In the example of FIG. 1A, the database management system 150 comprises an in-memory database 152. Alternatively, or additionally, the database management system may comprise a column-store database. The phrase "in-memory database" refers to a database technology that relies primarily on memory, such as memory 151, for data storage, such as the storage of database tables. In other words, the in-memory database 152 primarily stores database tables (or, e.g., a database column in the case of a column-store database) in the memory 151 (e.g., random access memory, RAM), rather than disk. As such, the in-memory database can avoid the decreased performance associated with disk access. The phrase "column-store database" refers to a database management system that stores data tables by column rather than by row.

In the example of FIG. 1A, the in-memory database 152 may persist some data, such as database tables that are infrequently used or snapshots of other in-memory data, to persistent storage 140 (which may be implemented as disks or solid state storage (SSD) devices).

In operation, the in-memory database 152 (or, as noted, the database execution engine 130) may receive a query and generate a query plan for execution of the query. If the query requires data from database tables that are stored completely in the in-memory database 152, the data is referred to a column-loadable (CL) data, so the in-memory database can respond to the query without accessing the persistent storage 140. If however, the query requires data from database tables that are not stored in the in-memory database, the data may be retrieved from the persistence storage 140 and placed in the buffer cache 154. Buffer cache refers to a portion of memory (e.g., memory 151) providing temporary storage for data loaded from the persistent storage 140. If for example a query or database operation requires a portion of a column or a database table, the corresponding pages 142A-142B required to respond to the query may be identified and then loaded into the buffer cache 154. The phrase page-loadable (PL) data refers to this persistent data that is loaded into the buffer cache when needed for responding to a query.

The buffer cache 154 may be implemented as a memory, such as a RAM and/or the like, and may have a fixed memory size. As such, when the buffer cache is "full," the database management system 150 may need to evict the contents of one or more buffers in the buffer cache; otherwise, a query or other type of database operation cannot be processed. If the buffer cache is sized such that it is "too small" for example, the database management system 150 will be required to perform more frequent fetches from persistent storage 140 (causing a heavy processing load due to the input/output operations associated with fetches from persistent storage and loads into the buffer cache). But if the buffer cache is sized so that it is "too large," the total cost of the buffer cache is too high. As such, the database management system 150 seeks to optimize the usage of the buffer cache between the two noted extremes.

To illustrate by way of an example, a database operation (e.g., a delta merge and/or the like) associated with a query may require all of the pages for a given database table (or, e.g., a database column in the case of a column-store database) be used for the database operation. In this example, all of the buffers in the buffer cache 154 associated with these pages may be pinned, so that the operation can be completed. This may, however, cause other operations to not proceed as the buffer cache has insufficient storage to hold other page-loadable data (which is associated with other database operations) from the persistent storage 140. This example illustrates the importance of optimizing the usage of the buffer cache 154 associated with the in-memory database 152.

Figure 1B:
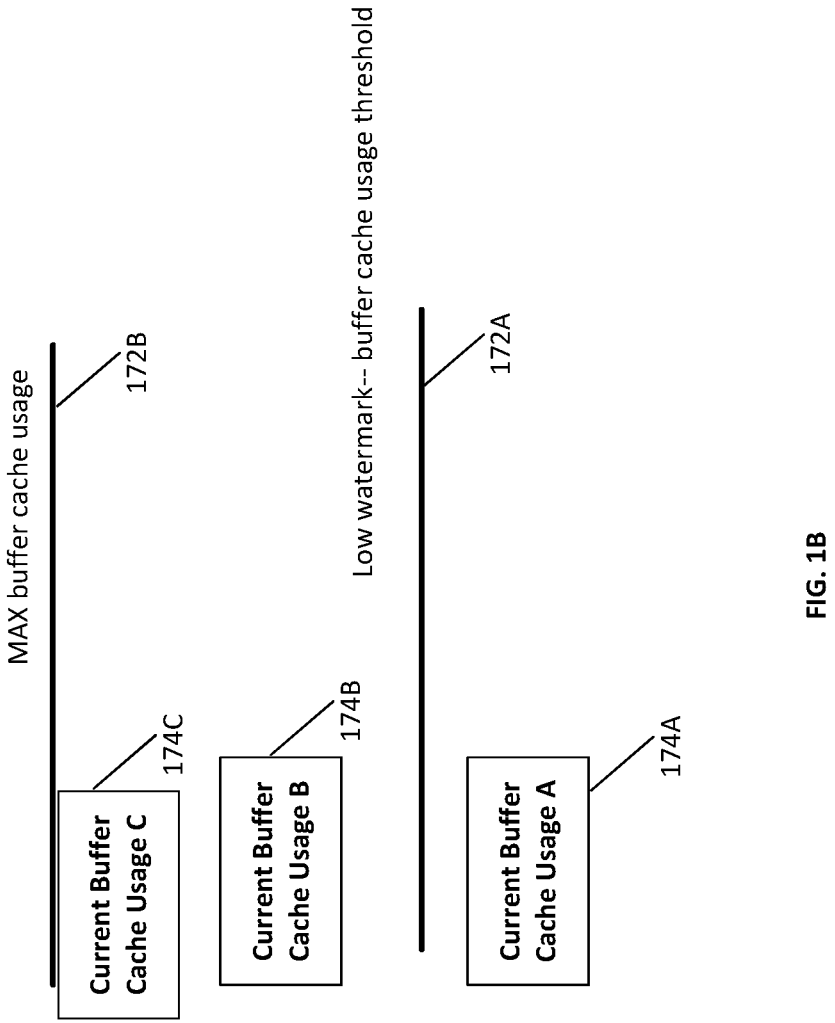
FIG. 1B depicts an example of the low watermark threshold, in accordance with some embodiments.

In some embodiments, there is provided a process to optimize usage of the buffer cache based on a low watermark threshold. FIG. 1B depicts an example of the low watermark threshold 172A. When the current usage of the buffer cache at 174A, such as buffer cache 154, is below the low watermark threshold 172A, buffers in the buffer cache do not need to be released (e.g., by eviction or removal of data from the buffers of the buffer cache), so queries and other database operations may proceed in a normal mode. However, when the current usage of the buffer cache at 174B exceeds the low watermark threshold 172A and is below the maximum buffer cache usage size 172B, a background job 153 is triggered to release one or more buffers in the buffer cache. During this release of buffers phase, query and other database operations may proceed in the normal mode as in the case when the current buffer usage 174A is below the low watermark threshold 172A. If however, the current buffer usage 174C meets the maximum buffer cache usage size 172B, new queries and/or new database operations cannot proceed until the contents of one or more buffers in the buffer cache are released to make room for storage in buffer cache of data. In some embodiments, the memory 151 contains (e.g., hosts) at least a portion of the database as an in-memory database. Alternatively, or additionally, the memory 151 hosts the buffer cache 151. Alternatively, or additionally, the memory 151 hosts the background job 153.

Referring again to FIG. 1A, the database management system 150 may be configured to include an the in-memory database 152, although the database management system may include other technologies, such as a column-based database, a row-based database, and/or the like. The one or more client devices 110A-B, the database execution engine 130, and the database management system 150 may be communicatively coupled via a network 120. Although not shown at FIG. 1A, the persistent storage 140 may also couple to the network 120. Moreover, the one or more client devices 110A may comprise one or more processor-based devices including, for example, a mobile device, a wearable apparatus, a personal computer, a workstation, an Internet-of-Things (IoT) appliance, and/or the like. The network 120 may be a wired network and/or wireless network including, for example, a public land mobile network (PLMN), a local area network (LAN), a virtual local area network (VLAN), a wide area network (WAN), the Internet, and/or the like.

FIG. 1C depicts an example of a process for managing the buffer cache usage, in accordance with some embodiments.

At 180, a first threshold size for page-loadable data at a buffer cache associated with a database (e.g., an in-memory database, in-memory column store database, column-store database, and/or the like) may be configured. For example, the in-memory database 152 may configure the first threshold size for the buffer cache 154. To illustrate, the first threshold size may comprise a low watermark threshold, such as low watermark threshold 172A. If for example a buffer cache has a maximum quantity of 1000 buffers (or, e.g., 1000 Megabytes), the low watermark threshold may be configured or set to a given value, such as a percentage of that maximum quantity, such as 700 buffers (or, e.g., 700 Megabytes). In other words, the low watermark threshold 172A represents a first threshold that is configured below a maximum memory size allocation (e.g., the maximum buffer cache usage size 172B) for the buffer cache. Alternatively, or additionally, the low watermark threshold may be configured by an end-user (via a user interface accessing the database management system 150), an administrative user (via a user interface accessing the database management system 150), the in-memory database, the database management system 150 and/or other components.

At 182, the buffer cache may be checked to determine usage by the page-loadable data. For example, the in-memory database 152 may check from time to time the buffer cache 154 to determine the current usage of the buffer cache. The current usage may indicate an actual amount of buffer cache memory being used, an actual amount of buffer cache memory remaining, a percentage of buffer cache memory being used, and/or a percentage of buffer cache memory remaining. For example, the in-memory database may check the buffer cache and determine the current usage of the buffer cache (by the page-loadable data) is 600 buffers (or, e.g., 600 Megabytes), which in this example corresponds to current buffer usage 174A and is below the low watermark threshold of 700 buffers (or, e.g., 700 Megabytes). Similarly, the in-memory database may again check the buffer cache and determine the current usage (by the page-loadable data) of the buffer cache is 800 buffers (or, e.g., 800 Megabytes), which in this example corresponds to current buffer usage 174B and is above the low watermark threshold of 700 buffers (or, e.g., 700 Megabytes). And, later yet, the in-memory database may check the buffer cache and determine the current usage of the buffer cache is 1000 buffers (or, e.g., 1000 Megabytes), which in this example corresponds to current buffer usage 174C, which in this example is at the maximum buffer cache usage of 1000 at 172B.

In some embodiments, the checking 182 may be triggered in response to receipt of a query from a client device. For example, when the database management system 150 receives a query and/or executes a query plan, the checking at 182 as well as the other aspects of the process of FIG. 1C may be performed to manage the buffer cache.

In response to the first threshold not being exceeded (no at 184), the buffer cache checking continues to determine usage by the page-loadable data of the buffer cache. Referring to the previous example, the in-memory database 152 may check the buffer cache 154 and determine the current usage of the buffer cache by the page-loadable data is 600 buffers (or, e.g., 600 Megabytes), which in this example corresponds to current buffer usage 174A which is below the low watermark threshold 172A (which in this example is 700 buffers (or, e.g., 700 Megabytes)), so the checking at 182 may continue. In other words, in response to the usage of the buffer cache 154 being less than the first threshold (e.g., low watermark threshold 172A), the in-memory database 152 continues to check the buffer cache to determine usage by the page-loadable data of the buffer cache (no at 184 and 182).

In response to the first threshold being exceeded (yes at 184 and 186), a background job is triggered causing the release of one or more buffers of the buffer cache. When for example the in-memory database 152 checks the buffer cache 154 and determines the current usage of the buffer cache at 174B exceeds the low watermark threshold 172A, the in-memory database may trigger a background job 153 to release one or more buffers in the buffer cache. In some embodiments, the in-memory database may trigger the background job 153 to release one or more buffers in the buffer cache, when the current usage of the buffer cache at 174B exceeds the low watermark threshold 172A but is below the maximum buffer cache usage at 174B. In other words, the usage of the buffer cache is above the low watermark threshold 172A (or the first threshold) but not so critical as being at or above the maximum buffer cache usage size 172B limit, so database operations can continue the "normal" usage of the buffer cache while the background job (which is a program that releases the buffers) creates additional free memory in the buffer cache.

To release one or more buffers, the background job 153 may identify one or more buffers in the buffer cache 154 to be released (e.g., evicted from the buffer) to free up memory in the buffer cache. While the background job is releasing buffers, the in-memory database 152 is still able to, as noted, process queries and use page-loadable data in the buffer cache 154 as the current buffer cache usage is below the maximum buffer cache usage size 172B.

As noted, a job, such as the noted background job 153, may release one or more buffers to free up memory in buffer cache 154. To reduce usage of the buffer cache for example, the background job may use a strategy to release buffers, so as to reduce the impact to on-going queries being handled by the database management system 150. In some embodiments, the buffers of the buffer cache may be associated with a freelist pool, a least recently used (LRU) pool, and a hot buffer list (HBL) pool. When this is the case, the background job may first seek to release one or more buffers listed in the freelist pool. The freelist pool represents a list of buffers in the buffer cache that have been allocated for use by certain (e.g., future or anticipated) buffer cache storage requests. As such, the background job may read the freelist to identify a buffer, check to make sure the buffer of the buffer cache is not being used, and then release the memory allocation for the buffer in the freelist pool-thus freeing up memory in the buffer cache. In some embodiments, after one or more buffers are released, the check at 182 may be performed (e.g., after as noted releasing at least one buffer of the buffer cache at 186) to see if the current buffer usage is still above or below the first threshold, such as the low watermark threshold. If the check reveals that the first threshold is no longer exceeded (yes at 188), the background job may stop releasing the contents of one or more buffers at 190. If the check reveals that the first threshold is still being exceeded (No at 188), the background job may continue releasing the contents of one or more buffers at 186.

In some embodiments, if the releasing of buffers from the freelist does not reduce the buffer cache usage below the first threshold, the background job may then seek to release other types of buffers, such as buffers in in the LRU pool. The least recently used (LRU) pool is a listing of buffers ranked from least recent used to most recently used. The background job may read the buffers in the least recently used pool and release the memory allocation for one or more buffers in the least recently used pool. In some embodiments, after one or more buffers are released using the LRU pool, the check at 182 may be performed to see if the current buffer usage is still above or below the first threshold, such as the low watermark threshold. If the check reveals that the first threshold is no longer exceeded (yes at 188), the background job may stop releasing the contents of one or more buffers at 190. If the check reveals that the first threshold is still being exceeded (No at 188), the background job may continue releasing the contents of one or more buffers at 186.

In some embodiments, if the releasing of buffers from the LRU pool does not reduce the buffer cache usage below the first threshold, the background job 153 may then seek to release other types of buffers, such as buffers in the HBL pool. The hot buffer list (HBL) pool is another listing of buffers in the buffer cache. The HBL list pool is similar to the LRU pool list in some respects but once a buffer is accessed frequently (e.g., 4 times or some other threshold quantity of times), the buffer is moved from the LRU list to the HBL. The HBL pool may be ranked from least recent used to most recently used. The background job may read the buffers in the hot buffer list pool and release the memory allocation for one or more buffers in the hot buffer list pool (e.g., starting with the least recently used buffer). In some embodiments, after one or more buffers are released using the HBL pool, the check at 182 may be performed to see if the current buffer usage is still above or below the first threshold, such as the low watermark threshold. If the check reveals that the first threshold is no longer exceeded (yes at 188), the background job may stop releasing the contents of one or more buffers at 190. If the check reveals that the first threshold is still being exceeded (No at 188), the background job may continue releasing the contents of one or more buffers at 186.

To illustrate further, if there are 100 buffers (e.g., 20 buffers in each of 5 pools) in a buffer cache freelist, the background job 153 may average out the number of buffers to be released from each pool. In this example, the background job may release 10 buffers from each pool for a total of 50 buffers being released. As such, a single, given pool is not always the target of releasing buffers as the releasing is distributed across different buffer sizes to average out the impact of release among all the sizes.

In another example use case, supposing there are 1024 4K pages in the freelist of 4K pools and there are 2 1-Megabyte free pages in freelist of the 1 Megabyte pool. Given the background job seeks to release 2 Megabyte of memory in the buffer cache, the background job 153 may release 512 4 Kilobyte pages and 1 1 Megabyte pages. Instead, the background pool may end up releasing all pages from 4 Kilobyte pool itself if that was least recently used. Solution to this can be found as part of shrink algorithm present in buffer cache. For example, supposing there are 1024 4K pages in LRU and 2 1M pages in the freelist. When this is the case, 1M pages will be targeted first for release since they are in freelist, while the order of precedence for which list to release buffers from is: 1. Freelist, 2. LRU, and then 3. HBL.

Figure 2:
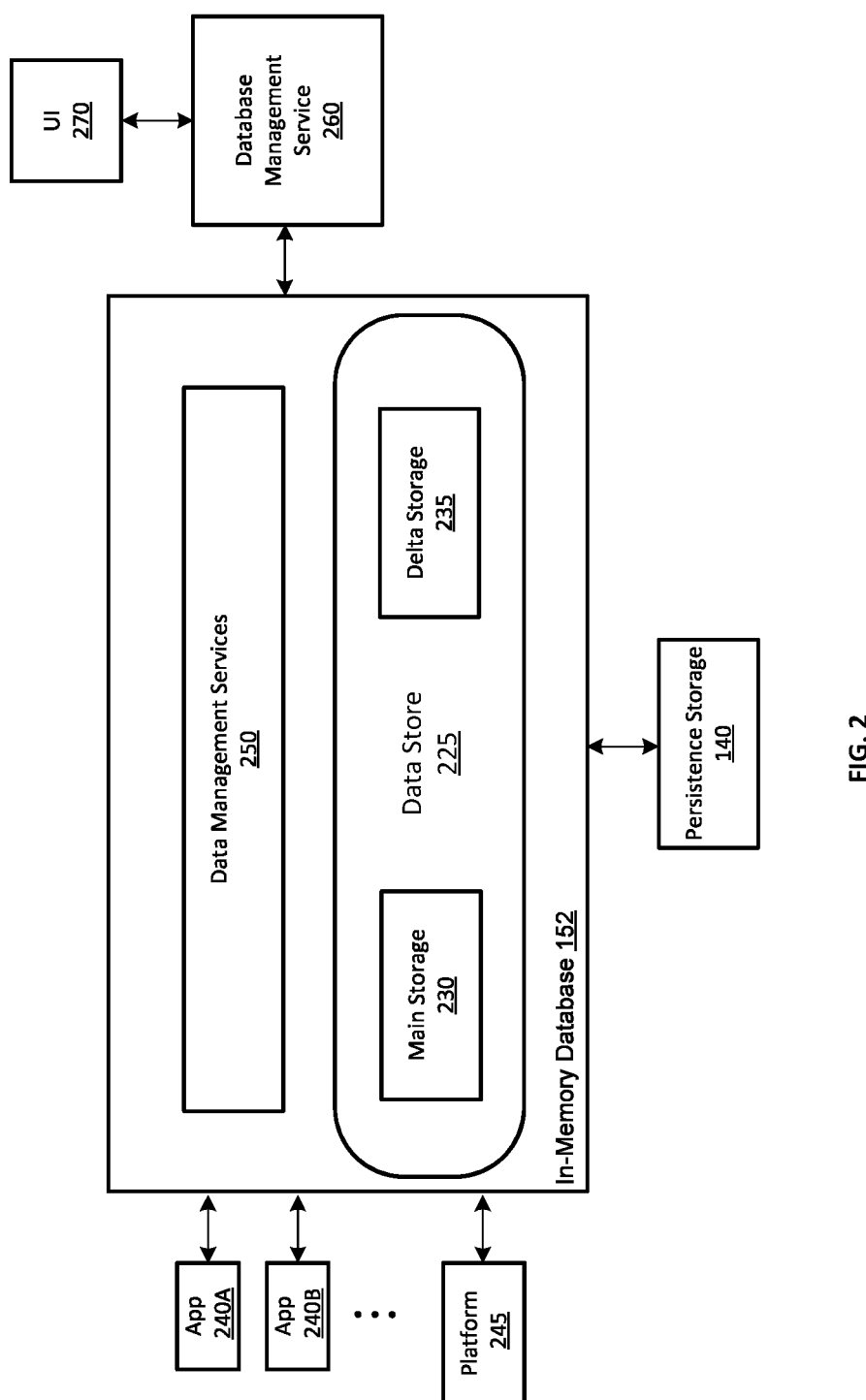
FIG. 2 depicts an example implementation of an in-memory database, in accordance with some embodiments.

FIG. 2 depicts another example of a system including the in-memory database 152. The system 200 may include one or more applications 240A-B that interact with and/or access the in-memory database 152. The applications 240A-B are representative of any number and type of applications executing within system 200. For example, the applications 240A-N may include analytical services, transaction processing service, reporting services, dashboard services, and the like. The applications 240A-N may interact with and/or access the in-memory database 152 using structured queries or other expressions (e.g., SQL queries). The system 200 may also include one or more platforms 245. In some embodiments, a given platform 245 may be a data warehousing service that exposes online analysis processing (OLAP) services to a user or application. The database management service 260 may provide administration services and access to settings of the in-memory database 152. The user interface (UI) 270 mediates interactions between the data management services 250 and a user or application, for example, to configure the in-memory database 152 or set user preferences for operations, such as sort operations and/or the like.

Within the in-memory database 152, the data management services 250 manage transactions with a main storage 230 and a delta storage 235. The data management services 250 may provide a calculation and planning engine, modeling services, real-time replication services, data integration services, and/or other services. The main storage 230 may support fast read access to data of the database 210 in data store 225. A read operation accesses both the main storage 230 and delta storage 235, which includes any recently changed data that has not yet been incorporated into the main storage 230. The data in the main storage 230 may be backed up or otherwise persisted to the persistence storage 140. Persistence storage 140 may be disk storage or other suitable type of storage device, such as an SSD. The change data in the delta storage 235 may also be backed up to persistence storage 140, so that changes survive events such as database failures, downtimes, and so on. In some embodiments, the persistence storage 140 stores database objects in a single, unified persistence format regardless of whether the data is page-loadable data or column-loadable data. It should be understood that the example architecture of system 200 is merely indicative of what may be employed in some embodiments. In other embodiments, system 200 may be structured in other suitable manners with other arrangements of components.

Figure 3A:
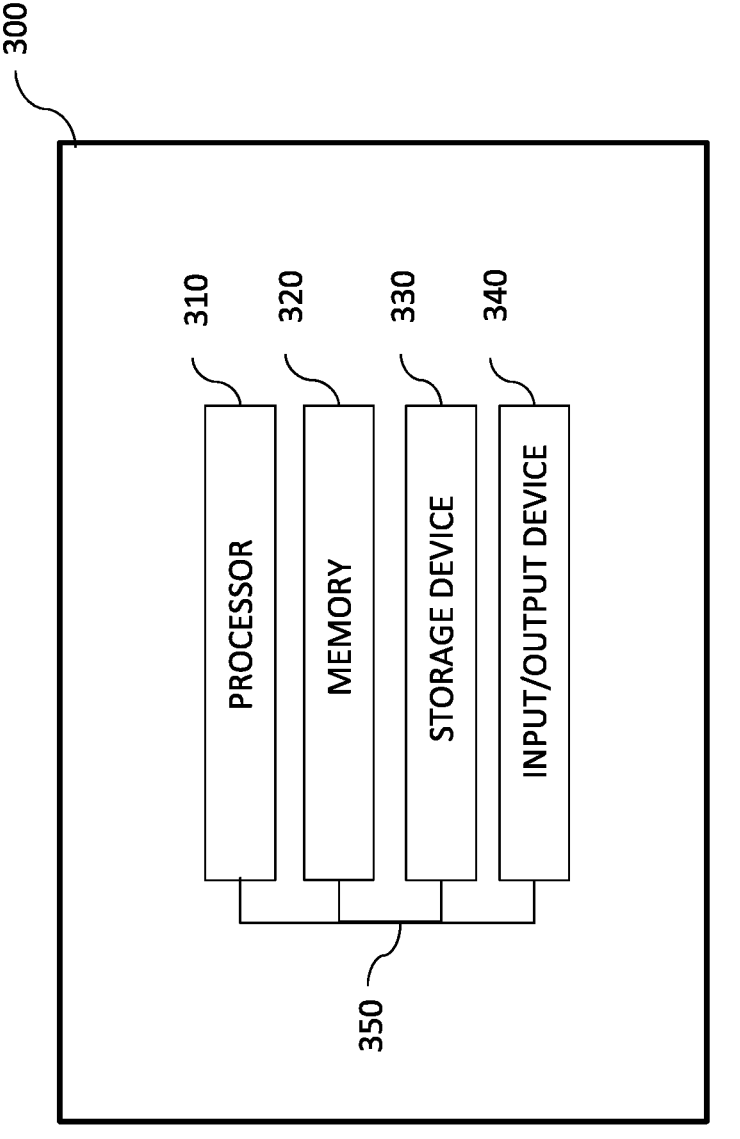
FIG. 3A depicts an example of a system, in accordance with some embodiments.

In some implementations, the current subject matter may be configured to be implemented in a system 300, as shown in FIG. 3A. The system 300 may include a processor 310, a memory 320, a storage device 330, and an input/output device 340. Each of the components (e.g., 310, 320, 330, and 340) may be interconnected using a system bus 350. The processor 310 may be configured to process instructions for execution within the system 300. In some implementations, the processor 310 may be a single-threaded processor. In alternate implementations, the processor 310 may be a multi-threaded processor. The processor 310 may be further configured to process instructions stored in the memory 320 or on the storage device 330, including receiving or sending information through the input/output device 340. The memory 320 may store information within the system 300. In some implementations, the memory 320 may be a computer-readable medium. In alternate implementations, the memory 320 may be a volatile memory unit. In yet some implementations, the memory 320 may be a non-volatile memory unit. The storage device 330 may be capable of providing mass storage for the system 300. In some implementations, the storage device 330 may be a computer-readable medium. In alternate implementations, the storage device 330 may be a floppy disk device, a hard disk device, an optical disk device, a tape device, non-volatile solid state memory, or any other type of storage device. The input/output device 340 may be configured to provide input/output operations for the system 300. In some implementations, the input/output device 340 may include a keyboard and/or pointing device. In alternate implementations, the input/output device 340 may include a display unit for displaying graphical user interfaces.

Figure 3B:
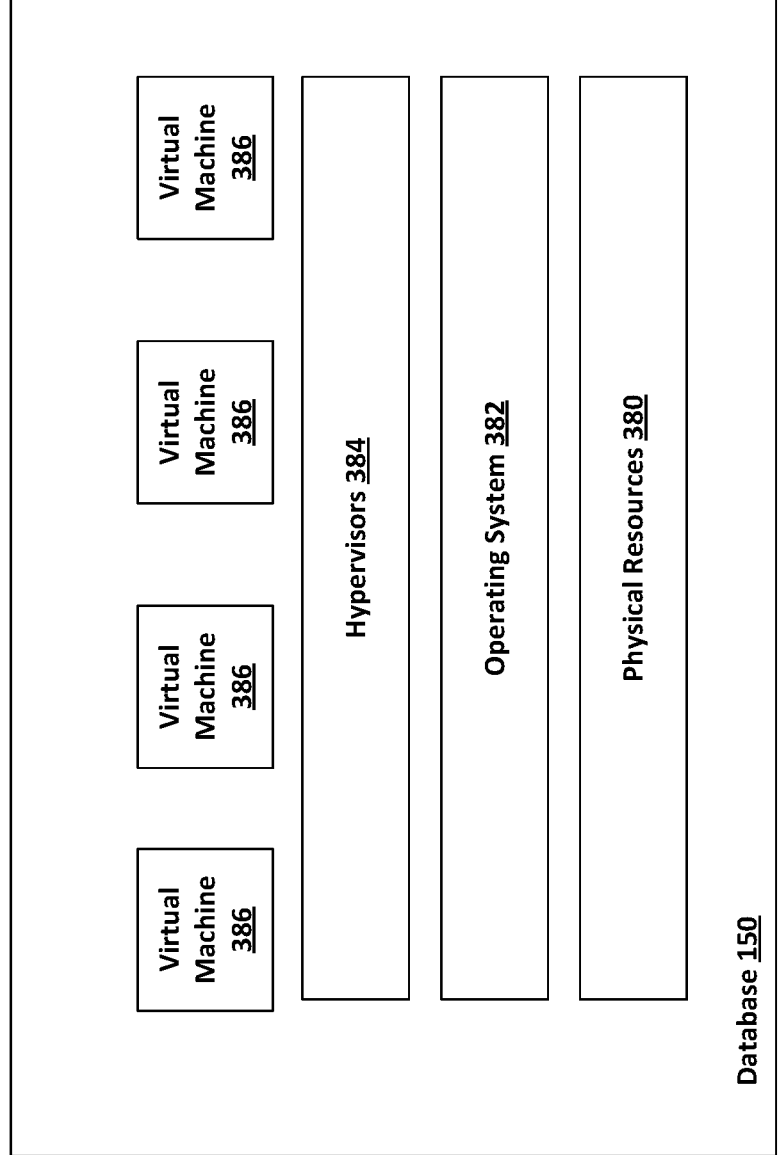
FIG. 3B depicts another example of a system, in accordance with some embodiments.

FIG. 3B depicts an example implementation of the database management system 150, which provides database services. The database management system 150 may include physical resources 380, such as at least one hardware servers, at least one storage, at least one memory, at least one network interface, and the like. The database management system 150 may also include infrastructure, as noted above, which may include at least one operating systems 382 for the physical resources and at least one hypervisor 384 (which may create and run at least one virtual machine 386). For example, each multitenant application may be run on a corresponding virtual machine.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A method comprising:
configuring a first threshold for page-loadable data at a buffer cache associated with a database;
checking the buffer cache to determine usage of the buffer cache by the page-loadable data;
in response to the usage of the buffer cache being less than the first threshold, continuing to check the buffer cache to determine usage by the page-loadable data;
in response to the usage of the buffer cache being more than the first threshold, causing a background job to release one or more buffers in the buffer cache;
checking, after releasing at least one buffer of the buffer cache, the buffer cache to determine whether usage by the page-loadable data is below the first threshold;
in response to the usage being below the first threshold, stopping the release of additional one or more buffers in the buffer cache; and
in response to the usage being above the first threshold, continuing the release of the additional one or more buffers in the buffer cache.

Example 2: The method of Example 1, wherein a memory hosts the database as an in-memory database and hosts the buffer cache.

Example 3: The method of any of Examples 1-2, wherein the first threshold is configured below a maximum memory size allocation for the buffer cache.

12

Example 4: The method of any of Examples 1-3, wherein the database checks from time to time the buffer cache to determine usage of the buffer cache by the page-loadable data.

Example 5: The method of any of Examples 1-4, wherein the usage of the buffer cache indicates an actual amount of the buffer cache being used, an actual amount of the buffer cache remaining, a percentage of buffer cache being used, and/or a percentage of buffer cache memory remaining.

Example 6: The method of any of Examples 1-5, wherein the checking is triggered by receiving a query at the database.

Example 7: The method of any of Examples 1-6, wherein in response to the usage of the buffer cache being more than the first threshold but less that a maximum threshold for the buffer cache, the background job causes the release of the one or more buffers in the buffer cache while one or more other database operations continue.

Example 8: The method of any of Examples 1-7, wherein the page-loadable data comprises a portion of a database table stored in a persistent store and loaded into the buffer cache when needed to respond to a query.

Example 9: The method of any of Examples 1-8, wherein the buffer cache includes one or more buffers listed in a freelist pool, a least recently used pool, and a hot buffer list.

Example 10: The method of any of Examples 1-9, wherein the background job releases a buffer listed in the freelist pool before releasing a corresponding buffer listed in the least recently used pool or the hot buffer list.

Example 11: The method of any of Examples 1-10, wherein the background job releases a buffer listed in the least recently used pool before releasing a corresponding buffer listed in the hot buffer list.

Example 12: A system comprising:
at least one processor; and
at least one memory including instructions, which when executed by the at least one processor, causes the system to provide operations comprising:
configuring a first threshold for page-loadable data at a buffer cache associated with a database;
checking the buffer cache to determine usage of the buffer cache by the page-loadable data;
in response to the usage of the buffer cache being less than the first threshold, continuing to check the buffer cache to determine usage by the page-loadable data;
in response to the usage of the buffer cache being more than the first threshold, causing a background job to release one or more buffers in the buffer cache;
checking, after releasing at least one buffer of the buffer cache, the buffer cache to determine whether usage by the page-loadable data is below the first threshold;
in response to the usage being below the first threshold, stopping the release of additional one or more buffers in the buffer cache; and
in response to the usage being above the first threshold, continuing the release of the additional one or more buffers in the buffer cache.

Example 13: The system of Example 12, wherein a memory hosts the database as an in-memory database and hosts the buffer cache.

Example 14: The system of any of Examples 12-13, wherein the first threshold is configured below a maximum memory size allocation for the buffer cache.

Example 15: The system of any of Examples 12-14, wherein the database checks from time to time the buffer cache to determine usage of the buffer cache by the page-loadable data.

Example 16: The system of any of Examples 12-15, wherein the usage of the buffer cache indicates an actual amount of the buffer cache being used, an actual amount of the buffer cache remaining, a percentage of buffer cache being used, and/or a percentage of buffer cache memory remaining.

Example 17: The system of any of Examples 12-16, wherein the checking is triggered by receiving a query at the database.

Example 18: The system of any of Examples 12-17, wherein in response to the usage of the buffer cache being more than the first threshold but less that a maximum threshold for the buffer cache, the background job causes the release of the one or more buffers in the buffer cache while one or more other database operations continue.

Example 19: The system of any of Examples 12-18, wherein the page-loadable data comprises a portion of a database table stored in a persistent store and loaded into the buffer cache when needed to respond to a query, wherein the buffer cache includes one or more buffers listed in a freelist pool, a least recently used pool, and a hot buffer list, wherein the background job releases a buffer listed in the freelist pool before releasing a corresponding buffer listed in the least recently used pool or the hot buffer list, and/or wherein the background job releases a buffer listed in the least recently used pool before releasing a corresponding buffer listed in the hot buffer list.

Example 20. A non-transitory computer-readable storage medium including instructions, which when executed by the at least one processor, causes operations comprising:

configuring a first threshold for page-loadable data at a buffer cache associated with a database;

checking the buffer cache to determine usage of the buffer cache by the page-loadable data;

in response to the usage of the buffer cache being less than the first threshold, continuing to check the buffer cache to determine usage by the page-loadable data;

in response to the usage of the buffer cache being more than the first threshold, causing a background job to release one or more buffers in the buffer cache;

checking, after releasing at least one buffer of the buffer cache, the buffer cache to determine whether usage by the page-loadable data is below the first threshold;

in response to the usage being below the first threshold, stopping the release of additional one or more buffers in the buffer cache; and in response to the usage being above the first threshold, continuing the release of the additional one or more buffers in the buffer cache.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:

configuring a low threshold and a maximum threshold for page-loadable data at a buffer cache associated with a database, wherein the low threshold is 70% of the maximum threshold;

checking the buffer cache to determine usage of the buffer cache by the page-loadable data;

in response to the usage of the buffer cache being below the low threshold, continuing to check the buffer cache to determine usage by the page-loadable data;

in response to the usage of the buffer cache being above the low threshold and below the maximum threshold, causing a background job to release one or more buffers in a freelist pool of the buffer cache while one or more other database operations continue;

checking the buffer cache after releasing the one or more buffers in the freelist pool to determine whether usage by the page-loadable data is below the low threshold;

in response to the usage being below the low threshold, stopping the release of the one or more buffers in the freelist pool;

in response to the usage being above the low threshold, causing the background job to release one or more buffers in a least recently used pool of the buffer cache while the one or more other database operations continue;

checking the buffer cache after releasing the one or more buffers in the least recently used pool to determine whether usage by the page-loadable data is below the low threshold;

in response to the usage being below the low threshold, stopping the release of the one or more buffers in the least recently used pool; and in response to the usage being above the low threshold, causing the background job to release one or more buffers in a hot buffer list pool of the buffer cache while the one or more other database operations continue.

2. The method of claim 1, wherein a memory hosts the database as an in-memory database and hosts the buffer cache.

3. The method of claim 1, wherein the low threshold is configured below a maximum memory size allocation for the buffer cache.

4. The method of claim 1, wherein the database checks from time to time the buffer cache to determine usage of the buffer cache by the page-loadable data.

5. The method of claim 4, wherein the usage of the buffer cache indicates an actual amount of the buffer cache being used, an actual amount of the buffer cache remaining, a percentage of buffer cache being used, and/or a percentage of buffer cache memory remaining.

6. The method of claim 1, wherein the checking is triggered by receiving a query at the database.

7. The method of claim 1, wherein the page-loadable data comprises a portion of a database table stored in a persistent store and loaded into the buffer cache when needed to respond to a query.

8. The method of claim 1, wherein the maximum threshold is 1000 buffers.

9. A system comprising:

at least one processor; and at least one memory including instructions, which when executed by the at least one processor, causes the system to provide operations comprising:

configuring a low threshold and a maximum threshold for page-loadable data at a buffer cache associated with a database, wherein the low threshold is 70% of the maximum threshold;

checking the buffer cache to determine usage of the buffer cache by the page-loadable data;

in response to the usage of the buffer cache being below the low threshold, continuing to check the buffer cache to determine usage by the page-loadable data;

in response to the usage of the buffer cache being above the low threshold and below the maximum threshold, causing a background job to release one or more buffers in a freelist pool of the buffer cache while one or more other database operations continue;

checking the buffer cache after releasing the one or more buffers in the freelist pool to determine whether usage by the page-loadable data is below the low threshold;

in response to the usage being below the low threshold, stopping the release of the one or more buffers in the freelist pool;

in response to the usage being above the low threshold, causing the background job to release one or more buffers in a least recently used pool of the buffer cache while the one or more other database operations continue;

checking the buffer cache after releasing the one or more buffers in the least recently used pool to determine whether usage by the page-loadable data is below the low threshold;

in response to the usage being below the low threshold, stopping the release of the one or more buffers in the least recently used pool; and in response to the usage being above the low threshold, causing the background job to release one or more buffers in a hot buffer list pool of the buffer cache while the one or more other database operations continue.

10. The system of claim 9, wherein a memory hosts the database as an in-memory database and hosts the buffer cache.

11. The system of claim 9, wherein the low threshold is configured below a maximum memory size allocation for the buffer cache.

12. The system of claim 9, wherein the database checks from time to time the buffer cache to determine usage of the buffer cache by the page-loadable data.

13. The system of claim 12, wherein the usage of the buffer cache indicates an actual amount of the buffer cache being used, an actual amount of the buffer cache remaining, a percentage of buffer cache being used, and/or a percentage of buffer cache memory remaining.

14. The system of claim 9, wherein the checking is triggered by receiving a query at the database.

15. The system of claim 9, wherein the page-loadable data comprises a portion of a database table stored in a persistent store and loaded into the buffer cache when needed to respond to a query.

16. The system of claim 9, wherein the maximum threshold is 1000 buffers.

17. A non-transitory computer-readable storage medium including instructions, which when executed by at least one processor, causes operations comprising:

configuring a low threshold and a maximum threshold for page-loadable data at a buffer cache associated with a database, wherein the low threshold is 70% of the maximum threshold;

checking the buffer cache to determine usage of the buffer cache by the page-loadable data;

in response to the usage of the buffer cache being below the low threshold, continuing to check the buffer cache to determine usage by the page-loadable data;

in response to the usage of the buffer cache being above the low threshold and below the maximum threshold, causing a background job to release one or more buffers in a freelist pool of the buffer cache while one or more other database operations continue;

checking the buffer cache after releasing the one or more buffers in the freelist pool to determine whether usage by the page-loadable data is below the low threshold;

in response to the usage being below the low threshold, stopping the release of the one or more buffers in the freelist pool;

in response to the usage being above the low threshold, causing the background job to release one or more buffers in a least recently used pool of the buffer cache while the one or more other database operations continue;

checking the buffer cache after releasing the one or more buffers in the least recently used pool to determine whether usage by the page-loadable data is below the low threshold;

in response to the usage being below the low threshold, stopping the release of the one or more buffers in the least recently used pool; and in response to the usage being above the low threshold, causing the background job to release one or more buffers in a hot buffer list pool of the buffer cache while the one or more other database operations continue.

* * * * *